United States Patent [19]

Hoyler et al.

[11] 3,746,857

[45] July 17, 1973

[54] SIGNAL RECEIVING APPARATUS FOR A VEHICLE CONTROL SYSTEM

[75] Inventors: Robert C. Hoyler, Pittsburgh; Brian R. Slattery, Turtle Creek, both of Pa.; George M. Thorne-Booth, Tarzana, Calif.

[73] Assignee: Westinghouse Electric Corporation, Pittsburgh, Pa.

[22] Filed: May 28, 1971

[21] Appl. No.: 147,806

[52] U.S. Cl............................. 246/36, 179/82
[51] Int. Cl............................. B61l 21/00
[58] Field of Search............... 246/34 CT, 8, 36; 343/787; 179/82

[56] References Cited
UNITED STATES PATENTS
3,694,751  9/1972  Takahashi et al............... 246/8 X

*Primary Examiner*—Gerald M. Forlenza
*Assistant Examiner*—Goerge H. Libman
*Attorney*—F. H. Henson, R. G. Brodahl and Jack M. Arnold

[57] ABSTRACT

A signal receiving embodiment which is operative in a vehicle control system includes a conductive track with a pair of conductive continuous rails. At least one conductive member is connected between the rails, and a plurality of signals are present in the rails, only one signal of which is desired to be sensed. The signal receiving embodiment includes at least one signal receiving means which is aligned in a predetermined position relative to the rails such that potentials induced in the signal receiving means by the desired signal are in a series aiding relationship whereas there is no potential induced by the undesired signals or if signal potential is induced by the undesired signals, the induced signal potential is in a series opposing relationship relative to the signal receiving means.

5 Claims, 9 Drawing Figures

Patented July 17, 1973  3,746,857

SIGNAL RECEIVING APPARATUS FOR A VEHICLE CONTROL SYSTEM

CROSS-REFERENCES TO RELATED APPLICATIONS

The present invention is related to the invention covered by U.S. Pat. No. 3,526,378 entitled "Signalling System For Determining The Presence Of A Train Vehicle" by George M. Thorne-Booth which is assigned to the assignee of the present invention.

BACKGROUND OF THE INVENTION

It has for some time been the practice in the operation of vehicle control signaling system to divide the vehicle track into a plurality of signaling blocks that are electrically insulated from each other. However, more recent vehicle systems are now using welded or continuous tracks involving longer sections of rails that are not adapted for the use of insulated joints, and as a result vehicle detection is more difficult with such a vehicle control system.

In such a vehicle control system there are usually a plurality of signals flowing through the conductive continuous tracks, which signals may include a desired signal that is to be sensed in a particular signaling block. However, in the particular signaling block there may also be present locally generated signals which are transmitted to adjacent signaling blocks and also propulsion currents which flow through the rails. It is desired to sense only the signal transmitted to the particular signaling block and to eliminate the sensing of any undesired signals, namely the locally transmitted signal and the propulsion currents flowing through the rails.

SUMMARY OF THE INVENTION

In accordance with the teachings of the present invention a signal receiving system is operative with a conductive track which includes a pair of conductive continuous rails in which at least first and second signals are present. There is at least one signal receiving means positioned in a predetermined alignment relative to the pair of rails and signal potential is induced in the one signal receiving means in response to the first signal, and in response to the second signal, signal potentials are one of not induced or induced in a series opposing relationship.

DESCRIPTION OF THE PREFERRED EMBODIMENT

Figure 1:
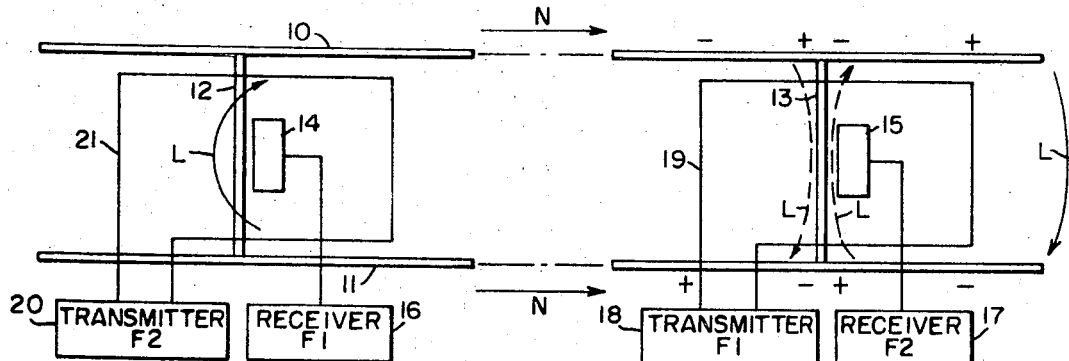
FIG. 1 is a schematic showing of a signaling system in which the signal receiving system of the present invention may be included.

In FIG. 1 there is provided a schematic showing of one vehicle control signaling system in which the signal receiving embodiment of the present invention may be operative. The vehicle control signaling system includes two conductive continuous rails 10 and 11 which may comprise a plurality of welded sections with no insulating joints between the sections. A vehicle (not shown) may travel along the track. A plurality of shunt bars such as the conductors or short circuit members 12 and 13 are connected between the rails 10 and 11 to balance the propulsion currents flowing through the rails as well as to provide a conductive path for the desired signal currents. The section of track between short circuit members is defined as a track circuit signaling block. At each short circuit member or track circuit signaling block boundary there is included a signal receiving means such as the signal receiving means 14 and 15 which are coupled to receivers 16 and 17 respectively. Operative at each boundary there is also a transmitter and a loop antenna. For example, at the boundary defined by the short circuit member 13 there is a transmitter 18 and a loop antenna 19. The transmitter 18 provides a signal which flows through the antenna 19 and which is termed the local signal and is depicted by the letter L on the drawing. It is seen that the configuration of antenna 19 is inherently cooperative with the physical form of conductor 13 to result in the local signal (L) being introduced into the rails with components of introduced signal potential acting in a series opposing relationship in a circuit through conductor 13, but in a series aiding relationship in a circuit through conductor 12 and through the conductor (not shown) at the other end of the signal block, to the right of conductor 13. To diagrammatically illustrate this inherent cooperation, there is shown on the drawing the polarities of voltage impressed upon the sections of rail 10 and 11 by the sides of the rectangular loop antenna 19 which is parallel thereto, for an instantaneous signal condition, as well as solid line arrows representing signal flow and phantom line arrows illustrating the counter balancing effect through conductor 13. The receiving antenna 15 is operative to sense the track signals at a frequency F2 which is flowing in the short circuit conductor 13 between the rails 10 and 12. The track signal at frequency F2 which is flowing in the rails is provided by a remote transmitter, for example, the transmitter 20 which couples the signal via the antenna 21 to the sections of rail on each side of the conductor 12. It is this signal at a frequency F2 which is desired to be sensed by the antenna or signal receiving means 15 operative with the conductor 13. As was mentioned the currents L flowing through the conductor 13 from the transmitter 18 are in a series opposing relationship, however, the currents L flowing through the rails 10 and 11 induce a magnetic field which in turn induces signal potentials which may be sensed by the receiver 15. It is necessary, therefore, to position the antenna 15 in a predetermined alignment relative to the track rails or the short circuit member 13 such that no signal potential is induced in the antenna 15 by the local field generated by the current L flowing through the track rails. Specific alignments of the antenna 15 are described to illustrate how the local field may not be sensed or if it is sensed the signals flowing in the antenna 15 are then in a series opposing relationship.

Figure 2:
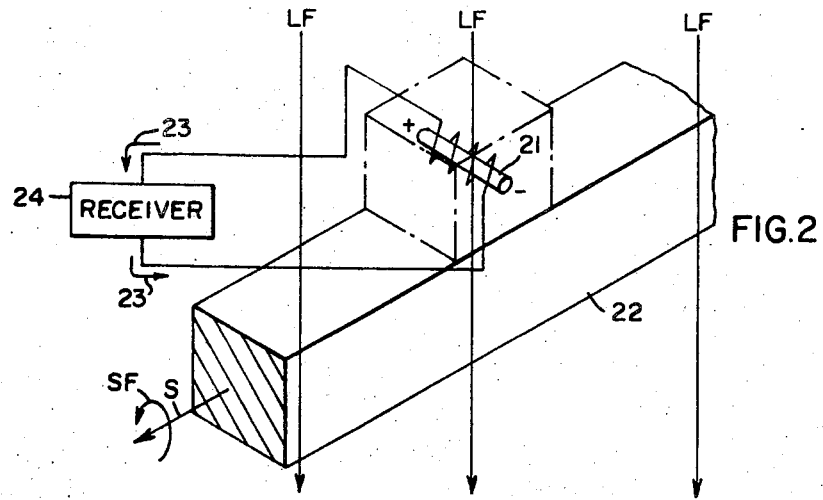
FIG. 2 illustrates a first technique for coupling one of the signal receivers to a typical short circuit member.

In FIG. 2 there is illustrated one embodiment in which a signal receiving means such as an antenna 21 is mounted on a short circuit member 22. The lines of flux from the local field are depicted by the lines LF, and it is readily seen that the flux lines are in the direction shown, by use of the right hand rule in relation to the current L as shown in FIG. 1. It is seen that the antenna or coil 21 is positioned such that its axis is orthogonal to the lines of flux LF. Therefore, no signal L due to the lines of flux FL is induced in the coil 21. The signal from the remote transmitter which is to be sensed by the coil 21 flows through the short circuit member 21 in a direction as illustrated by the arrow S, the lines of flux which are generated in response to the signal S are illustrated by the flux lines SF. The lines of flux SF intersect the coil 21 at an angle which is not orthogonal to the axis of the coil 21, and therefore current is induced in the coil 21 which flows in a direction as illustrated by the line 23. The coil 21 in turn is coupled to a receiver 24 which senses the remote or desired signal S. It is seen that in an arrangement as shown in FIG. 2 the positioning of the coil 21 is very critical, since if the coil 21 is positioned at any angle which is not orthogonal to the flux field LF created by the local signal L there is a limited amount of current induced in the coil 21 from the local transmission.

Figure 3:
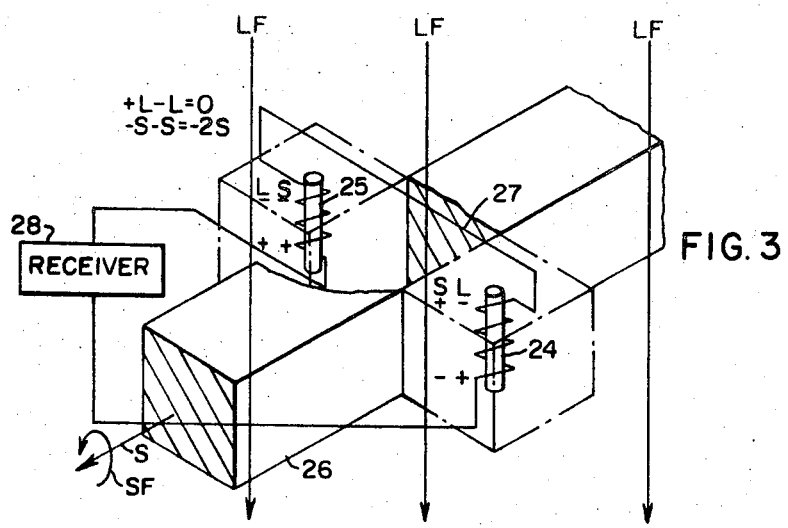
FIG. 3 illustrates a second suitable technique for coupling signal receivers to a typical short circuit member.

In FIG. 3 there is illustrated another embodiment for the positioning of signal receiving means on the short circuit member such that a desired signal S may be sensed and an undesired signal L which is induced in response to the flux lines generated by a local transmitter are not sensed. The lines of flux induced by the local transmitter are depicted by the lines LF and the lines of flux generated by the current from the desired signal S are depicted by the lines of flux SF. In this particular embodiment the positioning of the antennas relative to the flux lines LF is not critical. In this embodiment there are included two antennas or coils, namely the coils 24 and 25. These coils are mounted by suitable means to a short circuit member 26, with the only alignment requirement being that the coils 24 and 25 be aligned substantially parallel to one another relative to a plane of reference. The coil 24 is connected to the coil 25 by a lead 27. The other lead of coil 24 is connected to a receiver 28 and the remaining lead of the coil 25 is also connected to the receiver 28. The potentials induced across the coils 24 and 25 in response to the flux lines LF are illustrated by the plus and minus signs shown under the letters L which are adjacent to the coils 24 and 25, respectively. The potentials induced across the coil 24 and 25 in response to the flux lines SF are illustrated by the plus and minus signs under the letter S adjacent to the coils. It is seen in tracing the potential drop across the two coils due to the field LF that across the coil 24 there is a potential drop of +L, and across the coil 25 there is a potential drop of −L induced. Therefore, there is a resultant potential drop of zero sensed by the receiver 28 in response to the flux field LF. Across coil 24 there is a potential drop of −S due to the desired signal S, and a potential drop of −S across the coil 25 due to the desired signal S, resulting in a potential drop of −2S being sensed by the receiver 28. It is seen therefore, that the receiver 28 does not sense any potential induced by the local field LF due to the cancelling effect or series opposing relationship of the signal L in the two coils 24 and 25. However, the receiver 28 senses the desired signal S since there is a series aiding relationship of the potential drop across the coils 24 and 25 due to the lines of flux SF resulting in the signal −2S being sensed by the receiver 28.

Figure 4:
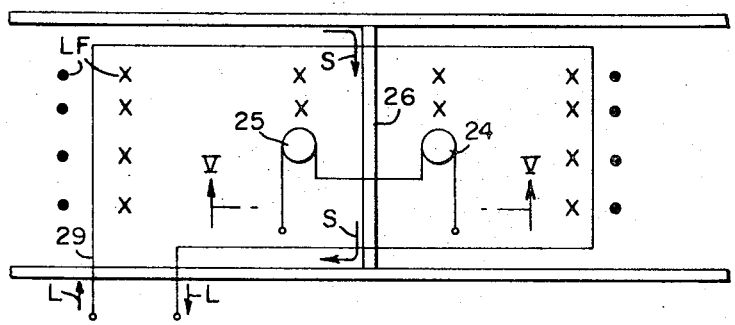
FIG. 4 is a top view of the signal receiving system of FIG. 3 and which includes a signal transmitting loop.

In FIG. 4 there is illustrated a top view of the coils 24 and 25 of FIG. 3 and their position relative to the conductor 26. There is also illustrated a loop antenna 29 which induces the local field LF about the coils 24 and 25. The flow of current through the loop antenna 29 is illustrated by the arrows L, and the lines of flux LF generated by the current flowing in the loop antenna 29 are illustrated by the dots (.) and X's LF wherein X depicts the lines of flux entering the plane of the drawing and the dots depict the lines of flux exiting the plane of the drawing. That the lines of flux are in the direction shown is readily apparent by the use of the right hand rule. The current provided by the desired signal S is shown by the arrows S.

Figure 5:
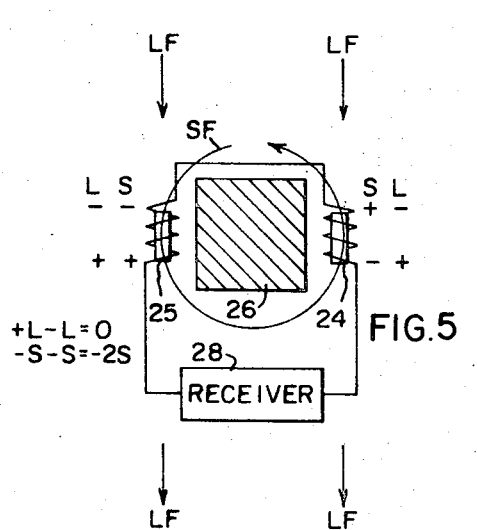
FIG. 5 is a section of FIG. 4 taken along the lines V—V.

FIG. 5 is a section of FIG. 4 taken along the line V—V. This figure is a clearer representation of how the lines of flux actually intersects the coils 24 and 25 and how the resulting signal potentials are produced. The potential drop induced across the coils 24 and 25 due to the local field lines of flux LF are depicted by the plus and minus signs directly below the letter L which is adjacent each coil. The potential drop induced across the coils 24 and 25 due to the desired signal S lines of flux SF is indicated by the plus or minus signs directly below the letters S adjacent the coils. In tracing the current flow from the receiver 28 through the coils and back to the receiver in a counterclockwise direction it is seen that the potential drop due to the local field LF is +L across the coil 24, and −L across the coil 25 which results in a series opposing relationship and a net resultant potential drop of 0 being sensed by the receiver 28. Following signal flow through the coils in the same direction due to the desired field of flux SF there is a potential drop of −S across the coil 24, and −S across the coil 25 resulting in a net potential drop of −2S being sensed by the receiver 28. It is seen therefore that the particular coil arrangement shown results in the cencellation of substantially all of the signal potential due to the local field LF.

Figure 6:
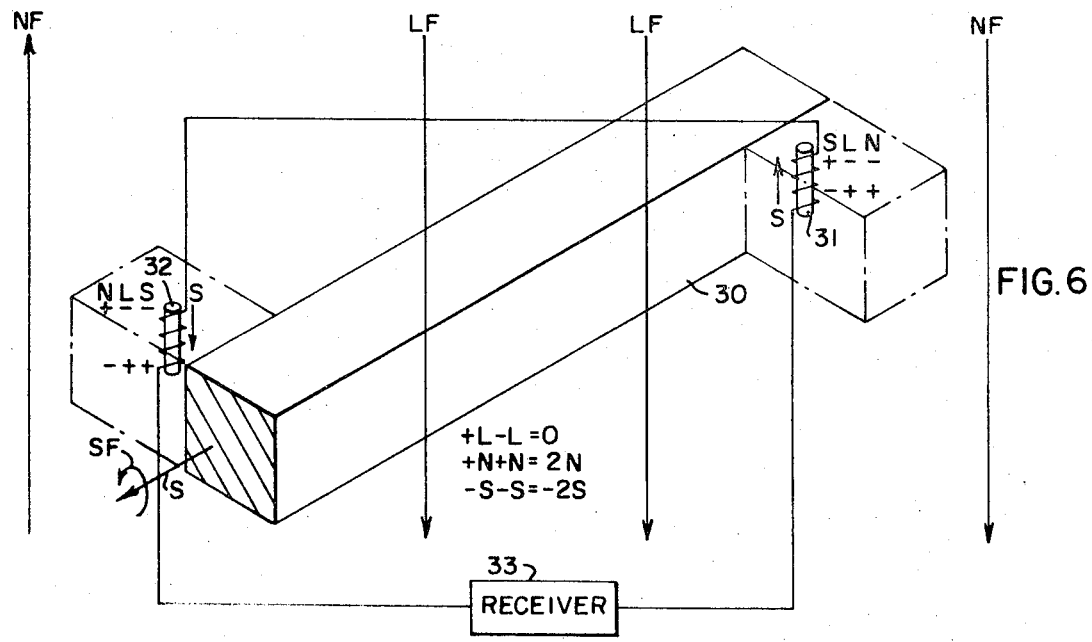
FIG. 6 is a schematic diagram illustrating two signal receiving means mounted on a short circuit member.
Figure 7:
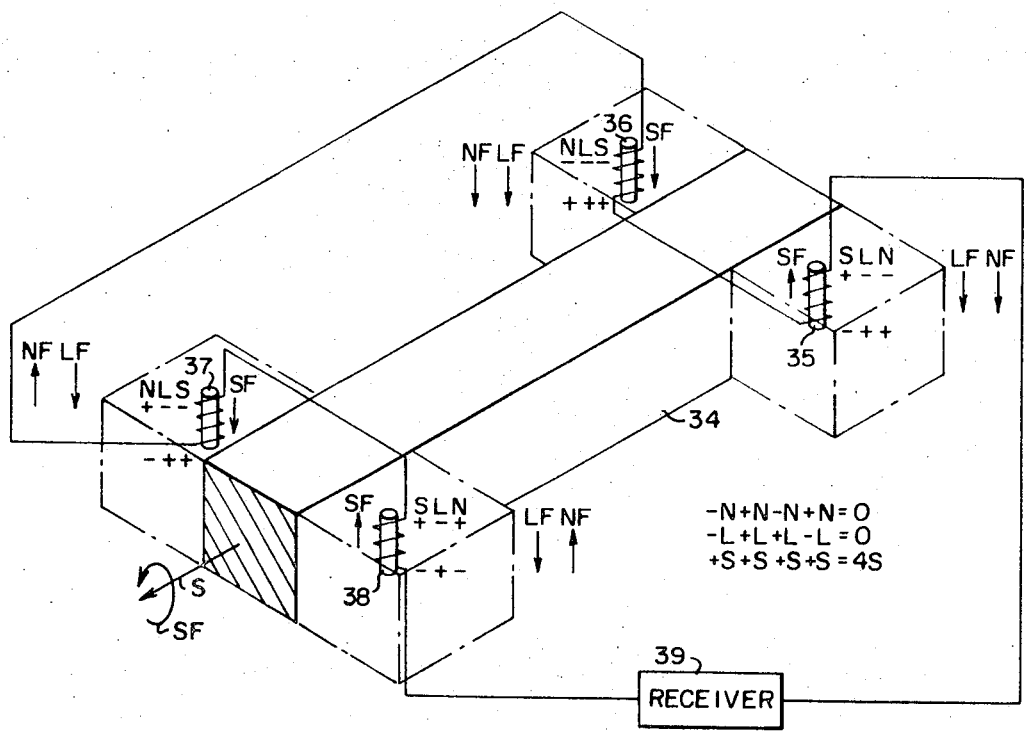
FIG. 7 is a schematic diagram illustrating four signal receiving means coupled to the short circuit member.

In FIG. 6 there is shown a short circuit member 30 which has two signal receiving antennas or coils 31 and 32 mounted on each end and on the opposite sides of the short circuit member 30. This is required in systems where a return for the propulsion currents is connected to the center of the short circuit member. In addition to the local field LF and the desired signal field SF being present there is also a signal field NF which is generated by the propulsion currents N which flow through the rails. Since the propulsion currents in the rails flow in the same direction in each rail there are lines of flux produced in one direction at one end of the short circuit member and in the opposite direction at the other end of the short circuit member. This is seen by the arrows NF as shown in the drawing, and it is readily seen that the flux lines NF are in the direction shown, by use of the right hand rule in relation to the currents N as shown in FIG. 1. The signal potential induced in the coils 31 and 32 due to each of the flux fields is illustrated under the letters S, L and N respectively which are adjacent to the coils 31 and 32. In tracing the potential drop due to the local field LF it is seen in tracing the flow of a counterclockwise direction that the potential drop across the coil 31 is +L and the potential drop across the coil 32 is −L which results in a potential drop of zero being sensed by the receiver 33. In tracing the potential drop due to the propulsion currents which is illustrated by the flux lines NF, the potential drop across the coil 31 is +N and the potential drop across the coil 32 is +N which results in the receiver 33 sensing a potential drop of 2N. Therefore the receiver 33 must include crystal filters or some such device, as shown in FIG. 7 of the referenced U.S. Pat. No. 3,526,378, to allow the passage of only the desired signal into the receiver and to block the signal potential 2N generated by the propulsion current. Tracing the potential drop across the coils for the desired signal S there is a potential drop of −S across the coil and −S across the coil 32 resulting in a potential drop of −2S being sensed by the receiver 33.

In FIG. 7 there is shown an antenna or coil embodiment in which the potential drops generated by the local noise field NF due to the propulsion current N are cancelled which in turn reduces the need for filters in the receiver which is coupled to the antenna arrangement. A short circuit member 34 has mounted thereon coils 35, 36, 37 and 38. These coils are connected together in a predetermined relationship such that the potentials induced across the coils due to the desired flux field SF are in a series aiding relationship whereas the potentials induced across the coils due to the local field LF and the noise field NF are in a series opposing relationship. The lines of flux due to the local fields are depicted by the lines LF, the lines of flux due to the noise field are depicted by the lines NF, and the lines of flux due to the desired signal S are depicted by the lines SF. The potential drop across each of the coils due to the respective fields of flux is depicted by the plus and minus signs directly below the letters S, L and N which are situated adjacent each of the coils. The potential drop across the coils due to the noise field NF is a follows: There is a potential drop of −N across the coil 35, +N across the coil 36, −N across the coil 37, and +N across the coil 38 which has a net result of zero potential being sensed by the receiver 39 due to the noise field NF. The potential drop across the coils due to the local field LF is as follows: Across the coil 35 there is a potential drop of −L across coil 36 +L, across coil 37 +L, and across coil 38 +L which results in a net potential drop of zero being sensed by the receiver 39 due to the local field LF. The potential drop across the coils due to the desired flux filed SF is as follows: Across the coil 35 there is a potential drop of +S, across the coil 36 a potential drop of +S, across the coil 37 a potential drop of +S, and across the coil 38 a potential drop of +S which is a resultant potential drop of 4S which is sensed by the receiver 39 in response to the desired flux field SF. The only requirement as far as coil positioning is that the coils 35 and 36 be positioned parallel to each other with respect to a plane of reference and that the coils 37 and 38 be positioned parallel to each other with respect to a plane of reference, which may be different than the plane of reference for the coils 35 and 36. If the coils 35 and 36 are positioned closer to one end of the short circuit member 34 than the coils 37 and 38 are positioned relative to the other end of the short circuit member 34, this has no effect on the cancellation of the potential drop since the respective coils cancel only the potential drop generated by the flux field at their particular end of the short circuit member.

Figure 8:
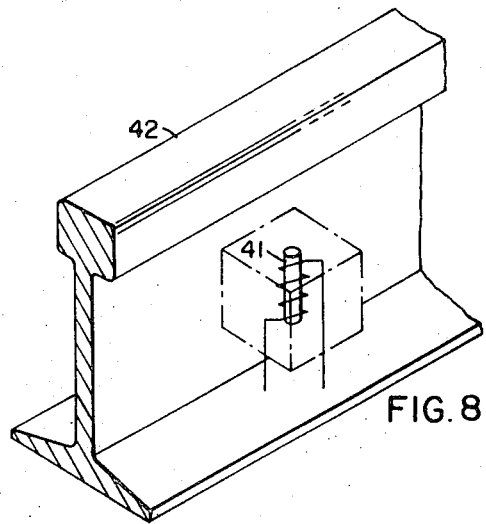
FIG. 8 illustrates one suitable technique for coupling signal receivers to a track rail.

In FIG. 8 there is illustrated how an antenna or receiving coil such as the coil 41 may be mounted on a rail 42. Such an arrangement may be used when for one reason or another the coils are not placed upon the short circuit member between the rails.

Figure 9:
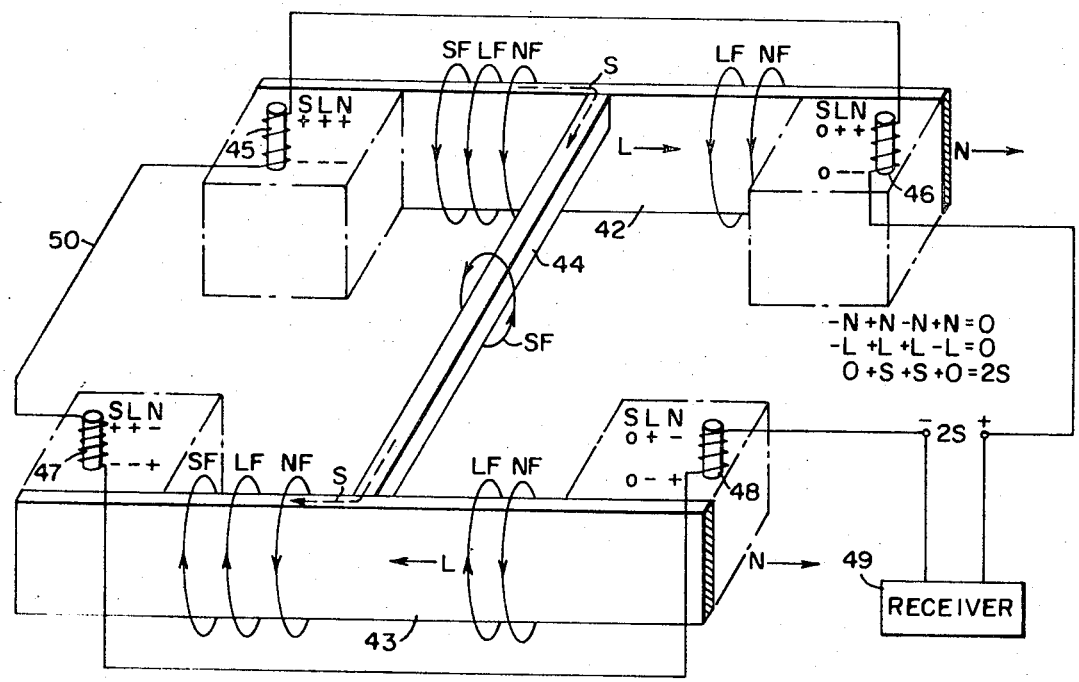
FIG. 9 is a schematic representation of four signal receivers coupled to the track rails.

In FIG. 9 there is shown an embodiment in which the antennas or receiving coils are placed on the conductive rails in a manner as illustrated in FIG. 8. In each rail there are propulsion currents N flowing in a direction as depicted by the arrows N. Also there are currents L flowing in each rail depicted by the arrows L, which are generated by the local transmitter. There are also flowing in each rail and in the short circuit member 44 the current S generated by the desired signal which is to be sensed by the receiving coils, and which is depicted by the lines S in phantom. The fields of flux due to the propulsion currents or noise currents is depicted by the flux lines NF, the lines of flux due to the local current are depicted by the lines of flux LF, and the flux field generated by the desired signal S are depicted by the flux lines SF. Conductive rails 42 and 43 are bonded together by the short circuit member 44. The conductive rail 42 has mounted thereon antennas or receiving coils 45 and 46, and the conductive rail 43 has mounted thereon antennas or receiving coils 47 and 48. The potential induced in these coils due to the flux field SF. LF, and NF are depicted by the plus or minus signs under the letter S, L and N, respectively, which are placed adjacent each of the coils. The potential drop in each of the coils due to the respective flux fields will not be traced. In response to the flux field NF generated by the propulsion currents N, there is produced across the coil 46 a potential drop of −N, across the coil 45 a potential drop of +N, across the coil 47, a potential drop of −N, and across the coil 48 a potential drop of +N, with a resultant potential drop of zero being sensed by a receiver 49. In response to the local field LF there is produced across coil 46 a potential drop of −L, across coil 45 a potential drop of +L, across coil 47 a potential drop of +L, and across coil 48 a potential drop of −L with a resultant potential drop of zero being sensed by the receiver 49 in response to the local currents L which generated the local field LF. In response to the desired signal S the following potentials are induced in the coils. Across the coil 46 there is zero potential drop produced since the current S does not flow through the rail adjacent the coil 46, across the coil 45 there is potential drop of +S, across the coil 47 there is a potential drop of +S, and across the coil 48 there is no potential drop due to the desired signal S since no current from the desired signal S flows through the rail 43 adjacent the coil 48. The receiver 49 therefore senses a potential drop of 2S in response to the desired signal S. It is readily seen that an arrangement of only two coils such as the coils 45 and 46 on the rail 42 or alternatively the coils 47 and 48 on the rail 43 may be used to cancel the potential drops due to the local field LF and the noise field NF, since across each rail the field NF and LF produce series opposing relationships in the coils mounted on the respective rails. This could be accomplished by connecting the line 50 to the (−) terminal of the receiver 49 and removing the pair of coils on the rail 43. However, in practice an arrangement as illustrated in FIG. 9 is used in conjunction with other apparatus for sensing broken rails along the track.

In summary, a plurality of antenna or receiving coil arrangements, operative with a conductive track system, have been illustrated in which a first or a desired signal is sensed and at least a second or an undesired signal is not sensed or if sensed is sensed in a series opposing relationship in the coils which make up the antenna configuration, resulting in substantially eliminating the undesired signals.

We claim as our invention:

1. In a signalling system operative with a conductive track, including a pair of conductive rails, and a plurality of conductive members connected between said rails at predetermined locations, with the section of track between and including two such conductive members forming a track circuit signalling block, the combination comprising:

signal transmitting means located adjacent the conductive member forming one end of a given track circuit signalling block for inducing into said rails a local signal to be sensed in an adjacent track circuit signalling block;

means for inducing a desired signal into said rails to be sensed in said given track circuit signalling block; and signal receiving means, including at least first and second signal receiving antennas being positioned on opposite sides and opposite ends respectively of said conductive member forming one end of said given track circuit signalling block, said first and second signal receiving antennas being aligned substantially parallel to one another with respect to a reference plane, and being connected to one another in series such that the signal induced into said first and second signal receiving antennas by said local signal is in a series opposing relationship, and the signal induced into said first and second signal receiving antennas by said desired signal is in a series aiding relationship.

2. The combination claimed in claim 1, wherein said first and second signal receiving antennas comprise first and second coils, respectively, with each coil having first and second terminals, with the second terminal of the first coil being connected to the first terminal of the second coil; and said signal receiving means further including a signal receiver having two terminals, with one terminal being connected to the first terminal of the first coil, and the remaining terminal being connected to the second terminal of the second coil.

3. In a signalling system operative with a conductive track, including a pair of conductive rails, and a plurality of conductive members connected between said rails at predetermined locations, with the section of track between and including two such conductive members forming a track circuit signalling block, the combination comprising:

signal transmitting means located adjacent the conductive member forming one end of a given track circuit signalling block for inducing into said rails a local signal to be sensed in an adjacent track circuit signalling block;

means for inducing a desired signal from an adjacent track circuit signalling block into said rails to be sensed in said given track circuit signalling block;

first, second, third, and fourth coils, the first and second coils being mounted on opposite sides of one end of said conductive member forming one end of said given track circuit signalling block and being aligned substantially parallel with one another with respect to a reference plane, with said third and fourth coils being mounted on opposite sides of the other end of said conductive member and being aligned substantially parallel to one another with respect to a reference plane, said coils being connected in series such that the signal induced into said coils by said local signal is in a series opposing relationship, and the signal induced into said coils by said desired signal is in a series aiding relationship; and a signal receiver operative with said first, second, third, and fourth coils for sensing the signal induced in said coils.

4. In a signalling system operative with a conductive track, including a pair of conductive rails, and a plurality of conductive members connected between said rails at predetermined locations, with the section of track between and including two such conductive members forming a track circuit signalling block, the combination comprising:

signal transmitting means located adjacent the conductive member forming one end of a given track circuit signalling block for inducing into said rails a local signal to be sensed in an adjacent track circuit signalling block;

means for inducing a desired signal from an adjacent track circuit signalling block into said rails to be sensed in said given track circuit signalling block;

at least first and second coils, the first and second coils being mounted on one rail on opposite sides of said conductive member forming one end of a given track circuit signalling block and being aligned substantially parallel to one another with respect to a reference plane, said coils being connected in series such that the signal induced into said coils by said local signal is in a series opposing relationship, and the signal induced into said coils by said desired signal is in a series aiding relationship; and a signal receiver operative with said at least first and second coils for sensing the signals induced in said coils.

5. The combination claimed in claim 4 including third and fourth coils mounted on the other rail on opposite sides of said conductive member and being aligned substantially parallel to one another with respect to a reference plane, said third and fourth coils being connected in series with said first and second coils such taht the signal induced into said coils by said local signal is into a series opposing relationship and the signal induced into said coils by said desired signal is in a series aiding relationship.

* * * * *